Figure 1:
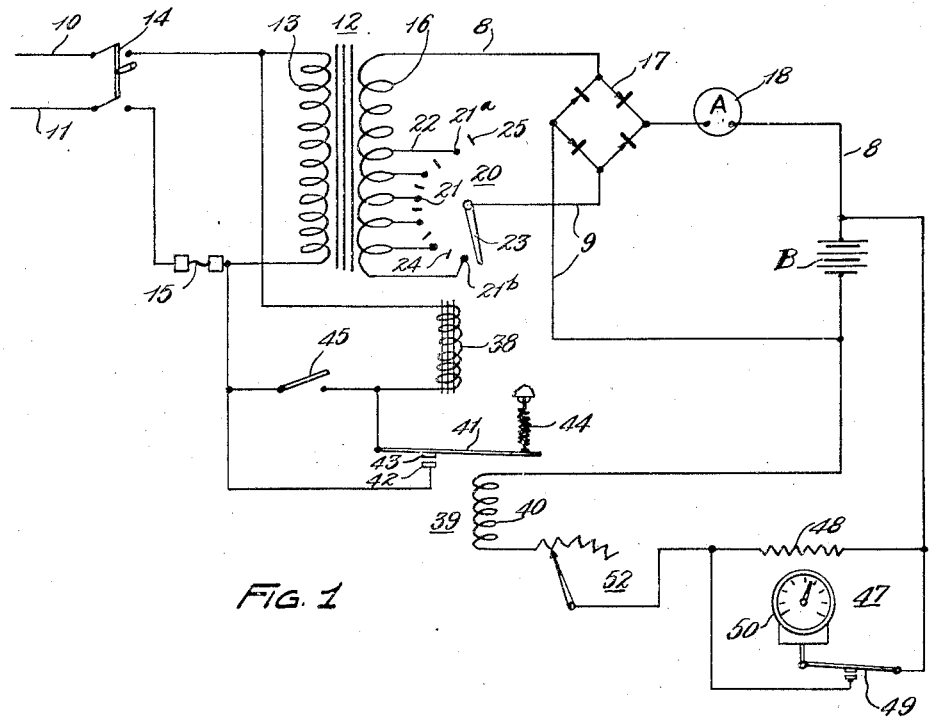

June 9, 1942.  R. E. SEARS  2,285,620

BATTERY CHARGING APPARATUS

Filed Aug. 2, 1940  2 Sheets-Sheet 1

INVENTOR.
RICHARD E. SEARS
BY Kwis Hudson & Kent
ATTORNEYS

June 9, 1942.  R. E. SEARS  2,285,620
BATTERY CHARGING APPARATUS
Filed Aug. 2, 1940  2 Sheets-Sheet 2

INVENTOR.
RICHARD E. SEARS
BY
Kwis Hudson & Kent
ATTORNEYS

Patented June 9, 1942

2,285,620

UNITED STATES PATENT OFFICE 2,285,620

BATTERY CHARGING APPARATUS

Richard E. Sears, Cleveland, Ohio, assignor to Willard Storage Battery Company, Cleveland, Ohio, a corporation of West Virginia Application August 2, 1940, Serial No. 349,937

3 Claims. (Cl. 171—314)

This invention relates to the charging of storage batteries, and more particularly to improved charging apparatus with which it is possible to materially shorten the charging period without subjecting the battery to injurious effects.

In the charging of storage batteries as ordinarily carried out, a relatively low charging rate has been employed and a period of several hours has been required to restore the battery from a discharged condition to a charged condition. To shorten the charging period it has been proposed to employ charging apparatus providing a relatively high charging rate or current for a relatively shorter period of time. The use of such a relatively high charging rate or current has certain disadvantages, one of which is that a relatively rapid increase in battery temperature may occur and the temperature may reach a value sufficiently high to cause weakening of the separators and to produce other injurious effects. Another disadvantage is that the high charging rate is likely to be accompanied by excessive gassing which is not only wasteful of current but tends to cause particles of the active material to become loosened or separated from the plates. Moreover, the condition of the ordinary discharged battery is such that a relatively high charging current can be satisfactorily used during the early part of the charging period, but if maintained throughout the entire charging period, it will produce excessive gassing, overheating and other unsatisfactory or harmful conditions.

By my invention these disadvantages are overcome and an improved high rate charging apparatus is provided with which the battery temperature can be kept below an injurious point and the portion of current which causes gassing can be kept at a relatively low or nominal value. As will be explained hereinafter, I make use of changes in the terminal voltage of the battery to so control the charging circuit as to prevent excessive gassing or an injurious increase in battery temperature.

It is, therefore, an object of this invention to provide improved battery charging apparatus in which means responsive to changes in the terminal voltage of the battery being charged operates to control the charging circuit so that a relatively high rate of charge can be maintained without causing overheating of the battery or excessive gassing.

Another object of my invention is to provide improved battery charging apparatus in which means responsive to a predetermined change in a condition of the battery causes a step-by-step decrease in the charging current or rate.

Still another object of my invention is to provide improved battery charging apparatus of the type referred to having a relay arranged to be connected across the terminals of the battery to be charged and a magnet controlled by the contacts of the relay and operable to cause a step-by-step decrease in the charging current or rate.

It is also an object of my invention to provide improved battery charging apparatus of this character in which a time delay device and a compensating means are provided for adjusting the operation of the relay to compensate for variations in the temperature or other condition of the battery to be charged.

Figure 2:
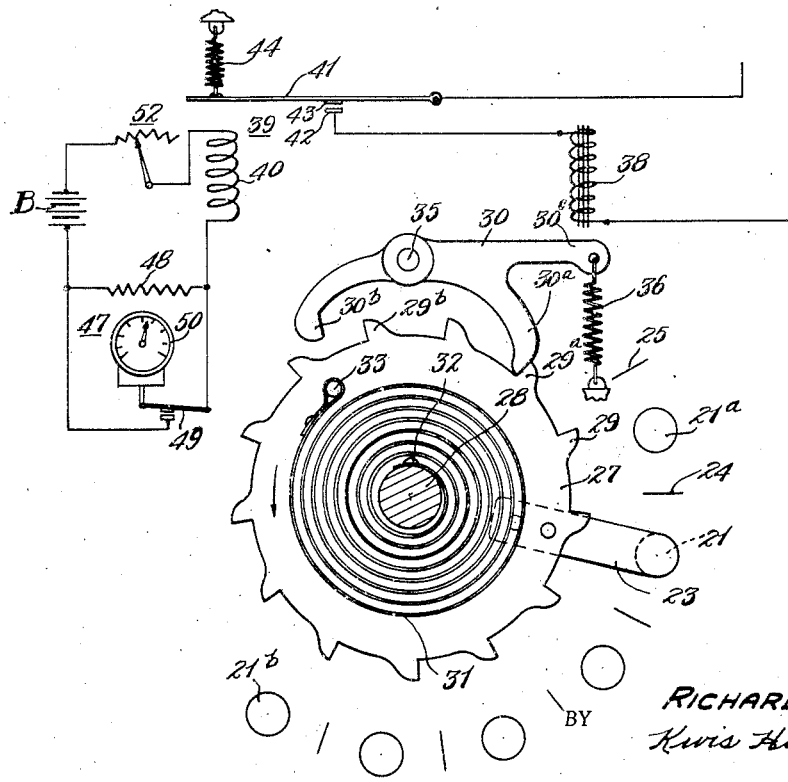
Figure 3:
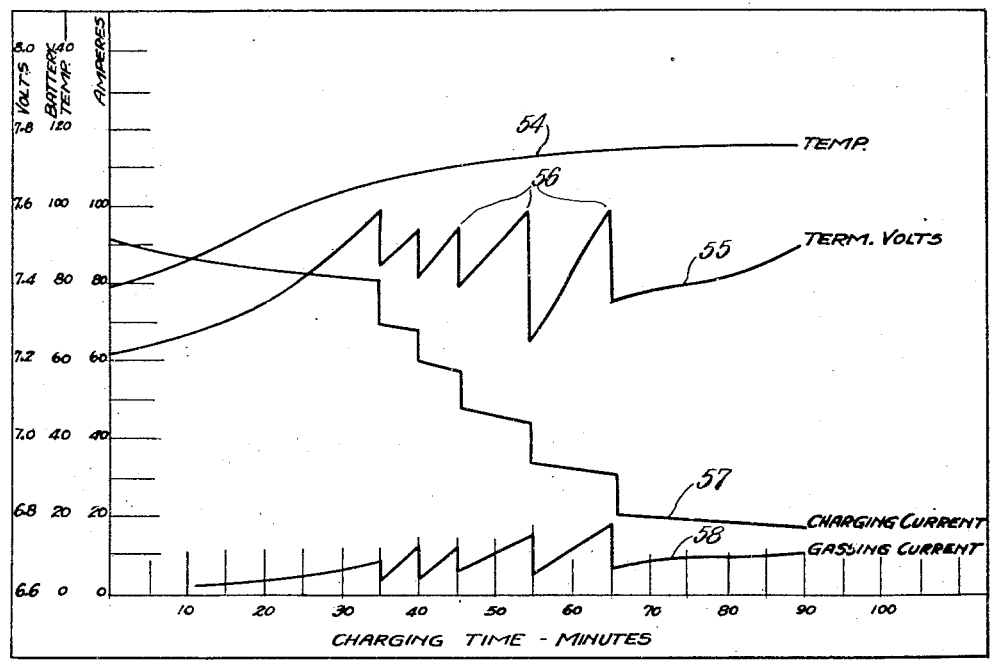

Other objects and advantages of my invention will be apparent from the following description when taken in conjunction with the accompanying sheets of drawings, in which, Fig. 1 is a diagrammatic view showing a battery charging system or apparatus embodying my invention;

Fig. 2 is another view, more or less diagrammatic in form, showing portions of the same system and further illustrating the construction and operation of the means for varying the charging rate or current; and Fig. 3 is a diagram or graphic illustration of the functioning of my improved charging apparatus.

Further reference will now be made to the accompanying drawings for the purpose of describing my improved charging apparatus and the operation thereof more in detail, but it will be understood, of course, that the particular apparatus herein illustrated and described in detail represents but one embodiment and that the invention may be applied to various other forms and arrangements of apparatus of this type.

In the present embodiment of my charging apparatus, as illustrated in Fig. 1, I provide a charging circuit having relatively heavy leads or conductors 8 and 9 adapted for connection with the terminals of a storage battery B to be charged, and a control means which is responsive to predetermined changes in the terminal voltage of the battery and affects the charging circuit so as to correspondingly vary the charging current or rate. The source of current for charging the battery B may be a pair of alternating current line conductors 10 and 11 and a transformer 12 having a primary winding 13 connected with such line conductors by the switch 14. A suitable fuse 15, or the like, may be included in the primary circuit of the transformer. The charging circuit may include the secondary winding 16 of the transformer 12 and a rectifier 17 which may be of any appropriate construction, but is here shown as being of the dry disk bridge type. An ammeter 18 may also be included in the charging circuit.

For varying the charging current and the rate of charge of the battery B, I provide a tap switch 20 in the charging circuit having a plurality of spaced contacts 21 connected with different portions or sections of the transformer secondary 16 by taps 22. The switch 20 also has a movable contact or arm 23 which can be shifted to different positions or settings for reducing the charging current or rate as the charging operation progresses. The spacing of the contacts 21 of this switch are preferably such that the movable contact or arm 23 must completely disengage one contact and open the charging circuit before it moves into engagement with the next adjacent contact. In other words, the spacing of the contacts is such that the arm 23 must move through an intermediate position represented by the line or mark 24 while traveling from one contact to the next adjacent one. In the switch 20, as here shown, the contact 21a represents the position or setting of the arm 23 for the smallest charging current or lowest charging rate and the contact 21b represents the position or setting of the arm 23 for the maximum charging current and the highest charging rate. The line or mark 25 lying beyond the extreme contact 21a represents the ultimate or final position of the movable arm 23.

I find it desirable to actuate the switch 20 with a step-by-step movement and to this end I may provide means which constantly biases or urges the movable contact arm 23 toward its final position 25, that is, in a direction to decrease the charging rate, and an escapement for limiting the movement of the contact arm by the biasing means. A device of this kind is shown in Fig. 2 as comprising an escapement member 27 which is rotatable or oscillatable on a stationary shaft or pin 28 and carries the contact arm 23 which is moved thereby to engage the contacts 21 in the manner above explained. The escapement member 27 may be in the form of a casing or wheel having a series of peripheral teeth 29 for cooperation with an escapement lever 30.

A spiral spring 31 may be employed as the biasing means which urges the member 27 in a direction to cause the contact arm 23 to be moved toward its final position 25. This spring may have one end thereof anchored to the shaft 28, as indicated at 32, and may have its opposite end suitably connected with the member 27 as by means of the pin 33. The escapement lever 30 may have arms 30a and 30b which retard the counterclockwise movement of the member 27 under the influence of the spiral spring 31 and may be mounted for rocking movement on the pin 35 to alternately bring such arms into the path of the movement of the teeth 29. A tension spring 36 may be connected with a projecting portion 30c of the escapement lever 30 so as to overbalance this lever and normally hold the same in a setting with the arm 30a thereof in a position to be engaged by one of the teeth 29.

Fig. 2 shows the escapement lever 30 with the arm 30a thereof engaged by the tooth 29a and also shows the contact arm 23 in engagement with one of the contacts 21 and held in this position by the escapement lever. When the lever 30 is rocked from this position, the arm 30a thereof will disengage the tooth 29a permitting the spiral spring 31 to rotate the member 27 in a counter-clockwise direction. This same rocking of the lever 30 will bring the arm 30b thereof into the path of the tooth 29b and the counter-clockwise rotation of the member 27 will be stopped thereby with the contact arm 23 occupying a position intermediate two adjacent contacts 21 as represented by the line 24. The return of the escapement lever 30 to the position shown in Fig. 2 under the influence of the spring 36 will disengage the arm 30b from the tooth 29b and will again bring the arm 30a into a position to be engaged by a succeeding tooth, and the additional counterclockwise movement thus permitted the member 27, shifts the contact arm 23 from the intermediate position 24 to the next succeeding contact. The cooperation of the lever 30 with the teeth 29 thus permits a step-by-step movement of the contact arm 23 by the spiral spring 31.

For controlling the above-described operation of the tap switch 23 in response to a predetermined change in the condition of the battery B being charged, I may provide a solenoid 38 for rocking the escapement lever 30 in opposition to the spring 36 and a relay 39 for controlling the energization of the solenoid. This relay may be of any suitable construction, and as here shown, has an energizing winding or coil 40 and a movable armature 41 for opening and closing the contacts 42 and 43. The relay winding 40 may have opposite ends thereof connected with the terminals of the battery B so as to be responsive to changes in the voltage thereof. A tension spring 44 acts on the armature 41 to normally separate the contacts 42 and 43.

The solenoid 38 is arranged adjacent the portion 30c of the escapement arm 30 so that upon energization of the solenoid this arm will be rocked on the pivot 35 in a counterclockwise direction, for the purpose above explained, and when the solenoid is deenergized the arm will be rocked in a clockwise direction by the spring 36. The winding of the solenoid 38 is arranged to be energized from the line connections from which the primary 13 of the transformer 12 is energized but such energization of the solenoid winding is controlled by the contacts 42 and 43 of the relay. I may also provide a manually operable push button switch 45, or the like, in a shunt around the relay contacts 42 and 43 so that the solenoid 38 can be energized by a manual closing of this switch independent of the relay 39.

In the operation of the apparatus above described, the leads 8 and 9 of the charging circuit are connected to the terminals of the battery B to be charged. The switch 14 is closed to energize the transformer 12. At this time the switch arm 23 is in the position represented by the mark 25 and the charging circuit is then open. It is desirable to start the charging of the battery with the highest available charging current or rate and, therefore, the arm 23 is swung into engagement with the contact 21b. This swinging of the arm 23 rotates the toothed member or escapement wheel 27 in a clockwise direction causing the spiral spring 30 to be wound or stressed so as to produce a bias or tendency to swing the arm 23 toward its released position 25.

At the beginning of the charging operation the terminal voltage of the battery B will be relatively low and the relay contacts 42 and 43 will, therefore, remain open. As the charging of the battery progresses the terminal voltage will increase and the resulting energization of the winding 40 of the relay 39 will cause the armature 41 to be attracted, closing the contacts 42 and 43 and energizing the solenoid 38. Energization of the solenoid will swing the escapement lever 36 and will permit the member 27 to be rotated one step, that is to say, from the contact 21b to the intermediate position 24. The disengagement of the contact arm 23 from the contact 21b will open the charging circuit and this will cause the terminal voltage at the battery to be suddenly decreased resulting in a sufficient deenergization of the relay winding 40 to permit opening of the contacts 42 and 43. The opening of the relay contacts causes deenergization of the solenoid 38 which permits the escapement lever 36 to be rocked in the opposite direction by the spring 36. This permits the member 27 and the switch arm 23 to be rotated in a counter-clockwise direction through another step, that is to say, from the intermediate position 24 to the next contact 21 thereby reclosing the charging circuit. Since a smaller section of the secondary of the transformer 12 is now being used, the charging current and rate will be lower than that with which the charging operation was started. As the charging operation continues at the reduced rate, the terminal voltage of the battery B will again build up to a value which will cause the relay contacts to be closed and the solenoid 38 to be energized, as above explained. In this way, a step-by-step actuation of the switch arm 23 is brought about and the charging current and rate are progressively decreased.

It may occur that the condition of the battery to be charged is such that it would be desirable to carry on the charging operation at the maximum charging rate for a given period of time without causing operation of the relay 39. This situation may occur when the temperature of the battery is relatively low at the start of the charging operation. However, when a cold battery is charged there is a sudden rise in the terminal voltage after which the value becomes reduced to a more normal point. If the relay were permitted to respond to this sudden rise in terminal voltage it would be immediately tripped without any need for reducing the charging rate. To prevent such premature operation of the relay I may provide a time delay device 47 in circuit with the relay winding 40. This device may comprise a resistance 48 in the relay circuit and an automatically operating switch 49 for short-circuiting this resistance out of the relay circuit. The switch 49 may be actuated by a suitable time device 50 which can be set or adjusted to cause closing of the switch 49 after the lapse of a certain interval of time. Thus if the battery to be charged is in a relatively cool condition, the maximum charging rate can be safely maintained during the first part of the charging operation and the time device 50 can, therefore, be set for a corresponding interval of time during which the resistance 48 will remain in the relay circuit and a higher voltage will be needed to operate the relay. After the lapse of this time interval the switch 49 will be closed to short-circuit the resistance 48 and thereafter the relay 39 will be responsive to the terminal voltage of the battery and will exercise the control function above explained.

Additional means may be provided for altering or adjusting the effectiveness of the relay 39 and this may comprise a variable resistance 52 which is also located in the circuit of the relay winding 40. When the temperature of the battery to be charged is initially low at the start of the charging operation, an increased portion of the resistance 52 can be placed in the relay circuit so that a higher voltage will be needed to trip the relay and hence the higher charging rate will be maintained. By placing more or less of the resistance 52 in the relay circuit, the operaitng characteristics of the relay can be thus adjusted to correspond more or less with the condition of the battery to be charged. The resistance 52 can be adjusted to the desired setting at the start of the charging operation and also, if desired, from time to time as the charging progresses. Different points on the resistance 52 can be calibrated in terms of the operating or closing voltage for the relay 39.

I have explained above that a manually operable switch 45 may be included in the circuit of the winding of the solenoid 38. The purpose of this switch is to enable the operator to manually reduce the charging rate or return the switch arm 23 to its final position 25 if conditions should make this desirable. The switch 45 is normally open, but can be closed or repeatedly closed by the operator to cause successive step-by-step movements of the switch arm 23 toward its final position 25. This manual actuation of the switch 45 may be necessary or desirable when it is observed that the battery being charged is not properly taking the charge as may be indicated by excessive gassing. It may also occur that a highly sulphated battery is connected in the charging circuit and may begin to gas violently after the first few minutes of charging without the occurrence of a sufficient increase in the terminal voltage to actuate the relay 39. Under these circumstances the operator would shift the switch arm 23 to a reduced charging rate by actuation of the switch 45.

The foregoing explanation of the operation of my improved charging apparatus can, perhaps, be better understood if reference is made to Fig. 3 which graphically illustrates the functioning of my apparatus. In this view the curve 54 shows the temperature increase which occurs in a battery being charged. The curve 55 represents the terminal voltage of the battery during the charging operation and the irregularities 56 in this curve represent the changes which occur in the terminal voltage as the result of the functioning of the relay 39 and the decreasing of the charging current caused by the step-by-step movements of the switch arm 23. In the functioning of the apparatus represented by the particular curves here shown, the relay was set by means of the variable resistance 52 to close or operate at approximately 7.6 volts and this explains why the terminal voltage drops abruptly whenever the curve approaches this value. The curve 57 represents the charging current and graphically shows how the charging current is decreased progressively as the result of the operation of the relay to progressively reduce the charging rate. The curve 58 represents the gassing current and it will be seen from this graphic illustration that the value of the gassing current is kept at a relatively low value during the operation of my charging apparatus.

From the foregoing description and the accompanying drawings it will now be readily seen that I have provided improved charging apparatus by which the charging of storage batteries can be carried out at a relatively high rate without producing a harmful increase in the temperature of the battery or resulting in excessive gassing. It will be seen, moreover, that in my improved apparatus a step-by-step decrease is automatically produced in the charging rate in response to predetermined increases in the terminal voltage of the battery being charged. Likewise, it will be seen that I have provided my improved charging system with means for adjusting the same to compensate for variations in the condition of the batteries to be charged.

While I have illustrated and described my improved charging apparatus in a more or less detailed manner, it will be understood, of course, that I do not wish to be limited to the particular arrangements and details of construction herein disclosed, but regard my invention as including such changes and modifications as do not constitute a departure from the spirit of the invention and the scope of the appended claims.

Having thus described my invention, I claim:

1. In a battery charging system, a transformer having a plurality of taps, a rectifier, a charging circuit adapted for connection with a battery to be charged and including said rectifier and a switch member cooperating with said taps, means biasing said switch member in a given direction, a toothed member and cooperating escapement lever for limiting actuation of said switch member by said biasing means, a relay having circuit connections for connecting the same across the terminals of the battery being charged and also having contacts adapted to be closed in response to a predetermined increase in the terminal voltage of the battery, a solenoid controlled by the contacts of the relay and arranged to actuate said escapement lever, and means for delaying the operation of the relay during the start of the charging operation comprising a resistance in the relay circuit, a switch arranged to short-circuit said resistance and a timing device adapted to close said switch upon the lapse of a predetermined time interval.

2. A battery charging system comprising a charging circuit adapted for connection with the terminals of a battery to be charged and having means movable to decrease the charging rate, means for causing actuation of said movable means including a magnet, a relay having contacts controlling said magnet, circuit connections for the relay connecting the same across the terminals of the battery, and means for preventing operation of the relay during the start of the charging of a cold battery comprising a resistance in the relay circuit, a switch arranged to short-circuit said resistance and a timing device adapted to close said switch upon the lapse of a predetermined time interval.

3. A battery charging system comprising a charging circuit adapted for connection with the terminals of a battery to be charged and having means movable to decrease the charging rate, means for causing actuation of said movable means including a magnet, a relay having contacts controlling said magnet, circuit connections for the relay connecting the same across the terminals of the battery, means for delaying the operation of the relay during the start of the charging operation comprising a resistance in the relay circuit, a switch arranged to short-circuit said resistance and a timing device adapted to close said switch upon the lapse of a predetermined time interval, and a manually variable resistance in the relay circuit for adjusting the operating characteristics of the relay in accordance with the temperature of the battery at the start of the charging operation.

RICHARD E. SEARS.